United States Patent [19]

Oliver

[11] Patent Number: 5,510,995
[45] Date of Patent: Apr. 23, 1996

[54] SCULPTURED SURFACE SYNTHESIS BASED ON FUNCTIONAL DESIGN CONSTRAINTS

[75] Inventor: James H. Oliver, Ames, Iowa

[73] Assignee: Iowa State University Research Foundation, Inc., Ames, Iowa

[21] Appl. No.: 106,483

[22] Filed: Aug. 13, 1993

[51] Int. Cl.$^6$ .............................. G06F 19/00; G06F 15/00
[52] U.S. Cl. .............................. 364/474.24; 364/474.05; 395/119; 395/140
[58] Field of Search .................. 364/474.05, 474.24; 395/119, 120, 140, 141

[56] References Cited

U.S. PATENT DOCUMENTS 5,014,230  5/1991  Sinha et al. .............................. 364/578
5,119,309  6/1992  Cavendish et al. .................. 364/474.24

OTHER PUBLICATIONS

Robert Light, et al., "Modification of geometric models through variational geometry," *Computer Aided Design*, vol. 14, No. 4, pp. 209–214, Jul., 1982.

Pigel, L. et al, "Curve and Surface Construction Unsing Rational B-splines," *Computer Aided Design*, vol. 19, No. 9, pp. 485–497, Nov., 1987.

Shimada, T. et al., "Approximate Transformation of Arbitrary Curved Surface Into a Plane using Dynamic Programming Computer-Aided Design", vol. 23, No. 2, pp. 153–150. Mar., 1991.

Redont, P., "Representation and Deformation of Developable Surfaces," *Computer Aided Design*, vol. 21, No. 1, pp. 13–20, Feb., 1989.

Clements, J. C. et al. "A Fast, Accurate Algorithm for the Isometric Mapping of a Developable Surface," *Siam Journal on Mathematical Analysis*, vol. 18, No. 4, pp. 966–971, Jul., 1987.

Nirmal K. Nair and James H. Oliver "An Area Preserving Transformation Algorithm for Press Forming Blank Development," pp. 1–10.

Tetsuo Shimada and Yukio Tada "Development of a Curved Surface using a Finite Element Method," *Recent Advances*, pp. 23–30.

Kincaid, et al., "Numerical Analysis Mathematics of Scientific Computing," University of Texas at Austin, Brooks/Cole Publishing, pp. 64–71, 1991. (Month unknown).

Meyers, et al., "Surfaces from Contours," University of Alabama at Birmingham, Association for Computing Machinery, pp. 229–258, 1992 (Jul.).

Kawashima, et al., "A flexible quantitative method for NC machining Verification using a space-division based solid model," *The Visual Computer*, vol. 7, 149–157, 1991 (Month unknown).

Jerard, et al., "Approximate methods for simulation and verification of numerically controlled machining programs," *The Visual Computer*, vol. 5, pp. 329–348, 1989 (Month unknown).

(List continued on next page.)

*Primary Examiner*—Paul P. Gordon
*Attorney, Agent, or Firm*—Schwegman, Lundberg & Woessner

[57] ABSTRACT

A technique is presented for the synthesis of sculptured surface models subject to several functional design constraints. A design environment is specified as a collection of polyhedral models which represent components in the vicinity of the design surface, or regions which the surface should avoid. The primary functional constraint is formulated as a proximity penalty function such that the design surface is induced to avoid a tolerance envelope around each component. In addition, a constraint based on surface area is formulated to counteract the expansion effect of the proximity constraint. Secondary design constraints are formulated to maintain consistent surface topology, and exploit part symmetry. Surface synthesis is thus formulated as an optimization problem and solved via simulated annealing. Several example applications are presented to demonstrate the capabilities of the technique.

21 Claims, 12 Drawing Sheets

Microfiche Appendix Included
(1 Microfiche, 93 Pages)

OTHER PUBLICATIONS

A. B. Ekoule, et al., "A Triangulation Algorithm from Arbitrary Shaped Multiple Planar Contours," *ACM Transactions on Graphics*, vol. 10, No. 2, pp. 182–199 Apr., 1991.

Malhotra, et al., "Synthesis of Spatially and Intrinsically Constrained Curves Using Simulated Annealing," ASME Transactions, Journal of Mechanical Design, DE–vol. 32–1 Alliances in Design Automation—vol. 1 ASME 1991 pp. 145–155 (Month unknown).

Huang, et al., "Five–Axis NC Milling Simulation and Dimensional Verification via Dexel Representation", Computer Aided Design, Special Issue on NC Machining and Cutter Path Generation, B. K. Choi, ed. May 31, 1993, pp. 1–16.

Oliver, et al., "Automated Generation of Sculptured Surface Models", Artificial Intelligence in Optical Design and Manufacturing, Z. Dong, ed., Prentice Hall Environmental and Intelligent Manufacturing Systems Series, M. Jamshidi, Series, ed., 1993 (Aug.), Chapter 1, pp. 1–25.

Ki–Yin Change, et al., "A Method for NC Toolpath Interference Detetection for a Multi–Axis Milling System," *Control of Manufacturing Processes*, DSC–vol. 52, pp. 23–30, 1991 (Month unknown).

R. E. Barnhill, et al., "A marching method for parametric surface/surface intersection," *Computer Aided Geometric Design 7*, pp. 257–280, 1990 (Month unknown).

Robert L. Drysdale, III, et al., "Disrete Simulation of NC Machining," Algorithmica, pp. 33–60, 1989 (Month unknown).

Takafumi Saito, et al., "NC Machining with G–buffer Method," *Computer Graphics*, vol. 25, No. 4, pp. 207–216, Jul. 1991.

Yunching Huang, "Non–Constant Parameter NC Tool Path Generation on Sculptured Surfaces," *Computers in Engineering*, vol. 1, pp. 411–419, 1992 (Month unknown).

Tim Van Hook, "Real–Time Shaded NC Milling Display," *Siggraph '86,* vol. 20, No. 4, pp. 15–20, 1986 (Aug. 18–22).

Joseph Pagna, et al. "Designing and Mapping Trimming Curves on Surfaces Using Orthogonal Projection," (Date unknown).

Ashish P. Narvekar, Yunching Huang and James H. Oliver, "Intersection of Rays With Parametric Envelope Surfaces Representing Five–Axis NC Milling Tool Swept Volumes" DE–vol. 44–2, *Advances in Design Automation*, vol. 2, ASME 1992, pp. 223–230 (Month unknown).

J. P. Menon and D. M. Robinson, "High Performance NC Verification VIA Massively Parallel Raycasting: Extensions to New Phenomena and Geometric Domains" PED vol. 59, *Concurrent Engineering* ASME 1992, pp. 179–194 (Month unknown).

Peter R. Atherton, "A Scan–line Hidden Surface Removal Procedure for Constructive Solid Geometry", *Computer Graphics*, vol. 17, No. 3, Jul. 1983, pp. 73–82.

Michael E. Mortenson, *Geometric Modeling*, Relational Properties, pp. 310–311 (Date unknown).

James D. Foley et al., "Spatial–Partitioning Representations" *Second Edition, Computer Grpahics*, Principles and Practice, pp. 549–550 (Date unknown).

J. H. Oliver and E. D. Goodman, "Direct Dimensional NC Verification" pp. 2–9; Jan 1990.

J. H. Oliver, "Efficient Intersection of Surface Normals with Milling Tool Swept Volumes for Discrete Three–Axis NC Verification", *Journal of Mechanical Design*, Jun. 1992, vol. 114, pp. 283–287.

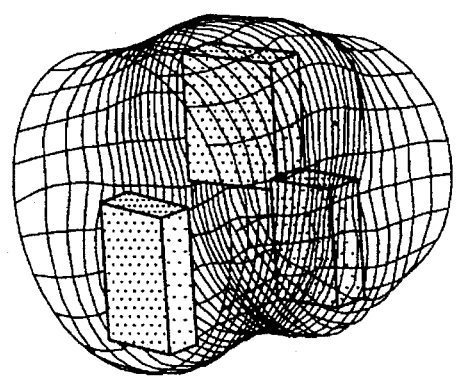 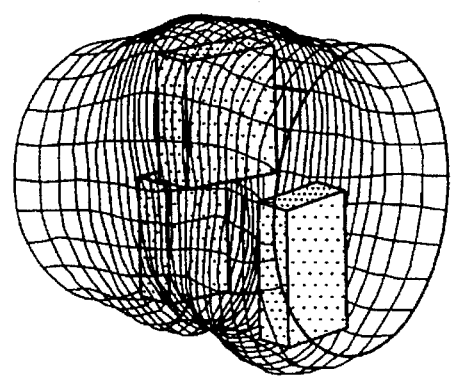
FIG. 6A  FIG. 6B
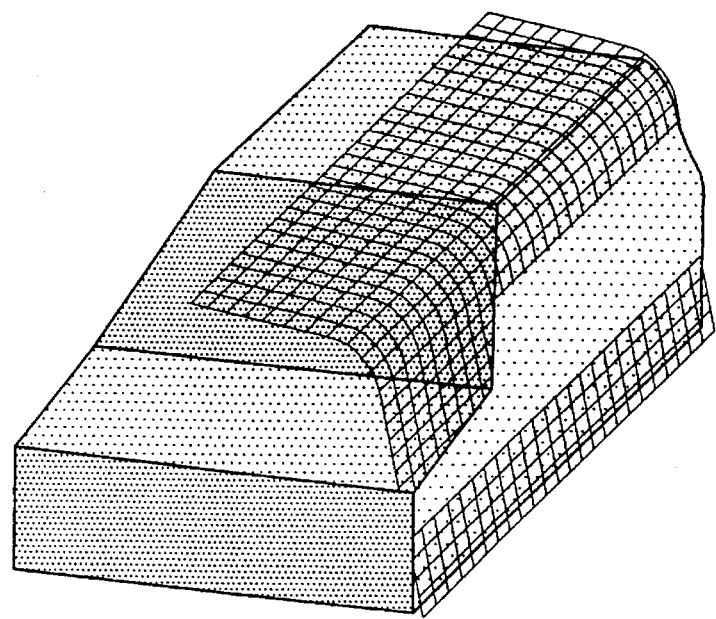
FIG. 7

SCULPTURED SURFACE SYNTHESIS BASED ON FUNCTIONAL DESIGN CONSTRAINTS

The present invention was made with the support of the U.S. Government under National Science Foundation grants numbers DDM-9111122 and DDM-9258114. The U.S. Government may have certain rights in the invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Included in the present specification is a microfile appendix containing 1 file and 93 frames.

TECHNICAL FIELD OF THE INVENTION

The present invention relates generally to computer-aided-design (CAD) and more particularly to method and apparatus of surface synthesis based on functional design constraints.

BACKGROUND OF THE INVENTION

Sculptured surface modeling technology is used extensively in the development of a wide variety of consumer and industrial products. However, the methodology for creating surface models has changed very little since these representation schemes were developed nearly thirty years ago (Böhm et al., 1984; Farin, 1988; Faux and Pratt, 1979). Surface models are traditionally generated by various interpolation techniques, based on the coordinate data sampled from a physical model. Consequently, the quality of the surface representation is dependent on the information content of the physical model at the time of data acquisition. Physical models are very expensive, and it is difficult to accurately incorporate changes and refinements of the physical model into the corresponding mathematical representation without completely recreating it. This leads to a rigid design process which inhibits the introduction of simultaneous engineering practices.

As product development cycles are compressed and the associated number of physical models are reduced accordingly, sculptured surface designers are being asked to capture more design information content per prototype. The technology for modification of existing sculptured surface models is well understood (Cohen et al, 1980; Piegl, 1989) as is the link between such models and automated manufacturing process planning (Kim and Biegel, 1988; Wysocki et al., 1989). Furthermore, recent advances in solid geometric modeling is leading to the robust incorporation (i.e., representation) of sculptured surfaces as an integral part of solid geometry (Casale and Bobrow, 1989; Saia et al., 1989).

Unfortunately, relatively few methods exist for the creation of surface models subject to constraints derived from spatial, aesthetic, or other design and manufacturing requirements. Techniques based on classical mechanics (Celinker and Gossard, 1991; Terzopoulos et al., 1987) come closest in spirit to this design paradigm. These techniques allow the designer to control the shape of the surface by imposing boundary conditions and external loads.

SUMMARY OF THE INVENTION

The present invention provides a unique new method and system for the automatic generation of sculptured surface models that will ultimately incorporate both the design and manufacturing process information which typically exists (or can be derived) during the conceptual stage of product development. In contrast to traditional methods of generating a surface by interpolating a grid of selected points, the designer works instead with polyhedral models of known or envisioned components to define obstacles which the surface must avoid by specified spatial tolerances. Additional input may include boundary or internal character curves and specified bounds on intrinsic surface properties generated from design constraints on functionality and manufacturability. The surface design problem is thus formulated as an optimization problem and solved via simulated annealing.

Although the ultimate goal is to incorporate constraints from a number of sources, the present invention focuses primarily on the typical "packaging" design function, in which a surface is desired to partially or totally enclose a volume within which known components exits. A common example is preliminary industrial design of products such as telephones or automobile bodies. First, a synthesis formulation is developed for non-uniform rational B-spline (NURBS) surface models. A general cost function is described which characterizes surface proximity to obstacles, surface area, parametric distribution, tangent vector orthogonality, and symmetric boundary conditions. Several examples are presented to demonstrate the synthesis of NURBS surface models in several distinct design environments.

According to another aspect of the invention, an object is designed by first specifying a plurality of control points of a NURBS surface, together with one or more obstacles to be avoided. An initial NURBS surface is generated, and then optimized by the simulated annealing of the present invention. Graphical display of the optimized design gives visual feedback to the operator of the system. The optimized design is then further refined or modified by use of a CAD system. The finalized design is then constructed in accordance with the final design data.

BRIEF DESCRIPTION OF THE DRAWING

FIGS. 6A and 6B illustrate two views of a non-axisymmetric configuration obtained using the surface synthesis process of the present invention, given the initial cylindrical configuration of FIG. 4;

FIG. 7 shows an initial configuration of a car surface;

DETAILED DESCRIPTION OF THE INVENTION

Figure 1:
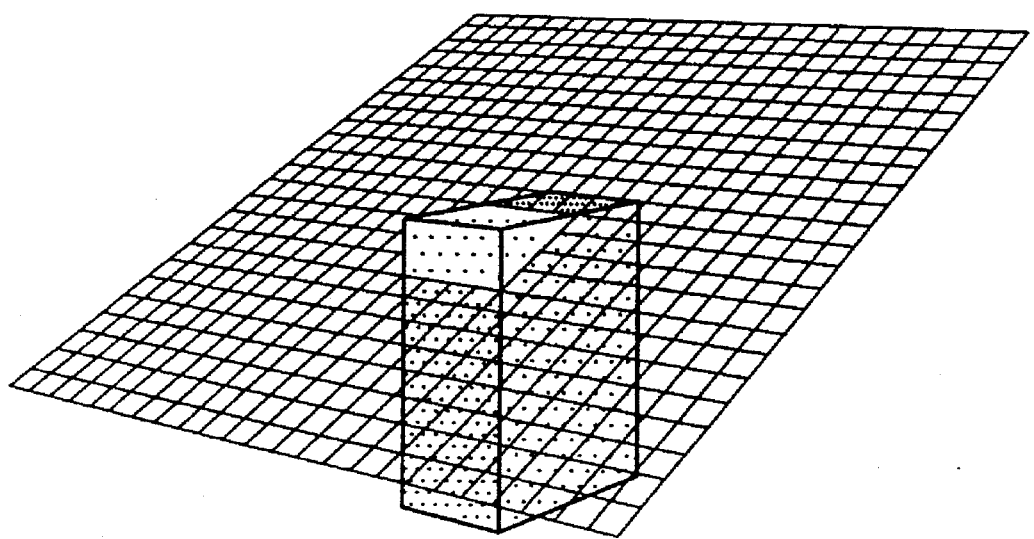
FIG. 1 shows an initial configuration of an obstacle and a NURBS surface.

In the following Detailed Description of the Preferred Embodiments, reference is made to the accompanying Drawings which form a part hereof, and in which is shown by way of illustration specific embodiments in which the invention may be practiced. It is to be understood that other embodiments may be utilized and structural changes may be made without departing from the scope of the present invention.

Surface Synthesis Formulation

In recent years, the non-uniform rational B-spline (NURBS) representation has emerged as a defacto standard for geometric modeling applications due to a number of attractive attributes. For example, NURBS can generally provide high order derivative continuity for parametric curve and surface design. In addition NURBS are well suited for interactive design due to the local nature of control point influence: i.e., modification of a single control point generally affects only a local vicinity of the surface, while the remainder is unaffected. In computer-aided design applications substantial numerical manipulation is common, thus the superior numerical stability of the Bernstein basis relative to the monomial (or power series) basis is significant (Farouki and Rajan, 1987). Another useful property of NURBS is the convex hull property, which states that the surface is always contained within the convex hull of its control polygon (Farin, 1988). Finally, NURBS can be used to precisely represent common quadric surfaces such as spheres, cones, ellipsoids, etc. (Piegel and Tiller, 1987). General descriptions of B-spline curves and their various forms can be found in most geometric modeling textbooks (e.g., Farin, 1988, and Mortenson, 1985) or any of several survey articles on the topic (e.g., Böhm et al., 1984 and Piegl, 1991). In the following, a brief description is provided to facilitate the problem formulation.

The B-spline basis functions are typically generated via the Cox-deBoor algorithm (Cox, 1972; deBoor, 1972). Given knot vector $T=\{t_0,..., t_i, t_{bi+1},..., t_m\}$ a monotonically increasing sequence of real numbers, the B-spline basis function of degree p (order p+1), denoted $N_{i,p}(t)$, is defined by the recursive relationship, $$N_{i,0}(t) = \begin{cases} 1 & \text{if } t_j \leq t < t_{j+1} \text{ and } t_j < t_{j+1} \\ 0 & \text{otherwise} \end{cases} \quad (1)$$

$$N_{i,p}(t) = \frac{t-t_i}{t_{i+p}-t_i} N_{i,p-1}(t) + \frac{t_{i+p+1}-t}{t_{i+p+1}-t_{i+1}} N_{i+1,p-1}(t)$$

where it is understood that 0/0=0. A B-spline surface of degree (p,q) is specified by an (m–p)×(n–q) grid of control points $P_{ij}$ arranged in a topologically rectangular array and knot vectors U and V of length (m+1) and (n+1), respectively. The surface, denoted as S(u, v), is thus defined as the tensor product of the control point array and the B-spline basis functions defined over each knot vector:

$$S(u,v) = \sum_{i=0}^{m-p-1} \sum_{j=0}^{n-q-1} N_{i,p}(u) N_{j,q}(v) P_{ij} \quad (2)$$

The knot vector governs the relationship between parametric and spatial variation, and its entries represent the parameter values at the segment joints (knots). A non-periodic B-spline is characterized by a knot vector in which the first and last knot values are repeated p+1 (degree) times. This results in a surface that interpolates the control points on the edge of the rectangular array. A B-spline is characterized as uniform if the difference between successive interior knots is constant. A rational B-spline allows assignment of a scalar weight factor to each control point. Homogeneous coordinates are used to represent a rational surface in r-dimensional space as a polynomial in (r+1)-dimensional space. A projective mapping is used to recover the resulting r-dimensional surface. Finally, the parametric derivatives of a NURBS surface (denoted by $S^u(u,v)$, $S^v(u,v)$, $S^{uu}(u,v)$, $S^{vv}(u,v)$ etc.) can be computed precisely (Böhm, 1984; Lee, 1983).

Using this terminology a simple surface synthesis problem is posed as follows. Consider the simple design environment depicted in FIG. 2. Suppose a sculptured surface model is desired in the vicinity of a single polyhedral obstacle. Suppose also that the general spatial location of the surface relative to the obstacle is known and is approximated initially by a planar distribution of control points as shown in the figure.

To characterize the desired functional behavior of the surface, a set of constraints is formulated to induce the surface to avoid the obstacle by at least some tolerance δ. These constraints characterize the global behavior of the surface. Additional constraints based on intrinsic surface properties which influence various aspects of functionality and manufacturability may also be incorporated. To maintain the rectangular topology of a surface patch, some of the control points (generally the corners) are designated as fixed. The coordinates of the remaining control points are the design variables of the surface synthesis problem, i.e., a surface is synthesized by finding suitable positions for the free control points such that all the constraints are satisfied.

Simulated Annealing Algorithm

Simulated annealing (SA) is a probabilistic "hill-climbing" optimization technique based on an analogy to the physical process of annealing (Kirkpatrick et al., 1983). In the physical process of annealing, a material is heated and allowed to cool slowly, at incrementally decreasing temperatures, so that it reaches thermal equilibrium at each temperature. As a consequence, its atoms will reach a state of minimum energy, despite any local minima. The SA algorithm first finds an area in the design space where the global minimum should be present, regardless of initial configuration and local minima found on the way. Finer details are then progressively developed, until a good, near-optimal local minimum if not the global minimum itself is found (Corana et al., 1987; Laarhoven and Aarts, 1987).

In SA, the objective (cost) function to be minimized is analogous to the total energy of the system. From an algorithmic point of view, SA is essentially an iterative improvement strategy augmented by a criterion for occasionally accepting higher cost configurations (Rutenbar, 1989). Given an objective (cost) function C(x) and an initial state vector $x_0$, iterative improvement seeks to improve the current state by randomly perturbing $x_0$ and if the new state $x_i$ yields a lower cost, then it replaces the current state and the perturbation process continues from $x_i$. If the perturbed state produces a higher cost than the original state then it is rejected, and the perturbation continues from the original state. This procedure is continued until no further improvement in the cost can be obtained. The drawback of iterative improvement is the possibility of converging to a local minimum. One could restart the process using a number of different initial configurations and take the best result, yet there is no guarantee that a good solution will be found. In addition, such an approach can be extremely inefficient.

If a higher cost state is generated in the SA algorithm, the state is accepted with a probability based on the current temperature, wherein the probability $P(x_i)$ of a given state $x_i$, is given as $$P(x_i) = e^{-\{\frac{|C(x_i)-C(x_{i-1})|}{T}\}} \tag{3}$$

Since the probability of accepting a higher cost state decreases with temperature, the SA algorithm mimics the physical process of annealing. This approach has been successfully applied to various problems, for example: VLSI circuit design (Devadas and Newton, 1987), structural truss design (Elperin, 1988), mechanism synthesis (Jain and Agogino, 1988), and robotic path planning (Sandgren and Venkatraman, 1989). Given its global nature and suitability for problems with a large number of variables, simulated annealing is ideal for application to problems in geometric model synthesis. In fact, Malhotra et al., (1991), demonstrate the feasibility of this approach to geometric curve synthesis problems.

Implementation of the simulated annealing algorithm requires the specification of a problem configuration, i.e., domain over which the solution will be sought. The definition of a neighborhood to govern the nature and magnitude of the allowable perturbation; a cost function which characterizes the function to be minimized; and a cooling schedule to control the rate of temperature decrement and the number of inner loop iterations. The present invention builds on the results of Malhotra et al., (1991). In particular, although the problem configuration has been generalized from a two- to a three-dimensional Euclidean space, the same neighborhood and cooling schedules have been applied.

Cost Function Formulation

Since the general cost function for this problem must accommodate components derived from several diverse contributing factors, a reasonable implementation is to sample the surface at a number of points, and sum the contribution of each point to each cost component. The individual cost components are defined as functions of surface point coordinates $S(u,v)$ (and/or its derivatives). They also depend on the number of samples M and N in the u and v parametric directions, respectively. Thus, M and N are used as input parameters; they have the expected trade-off effect between accuracy and convergence on the one hand and computational efficiency on the other. The components of the cost function are thus defined as sums of surface characteristics sampled at regular parametric intervals, i.e., $$u_0 = 0 \tag{4}$$

$$u_i = u_{i-1} + \frac{1}{M-1}, i = 1, 2, \ldots, M-1$$

$$v_0 = 0 \tag{5}$$

$$v_i = v_{i-1} + \frac{1}{N-1}, i = 1, 2, \ldots, N-1$$

For a given configuration the total cost contributed by each point on the surface is defined as the sum of the following terms:

$$C_{total} = C_{primary} + C_{secondary} \tag{6}$$

where, $C_{primary}$ dictates the gross global behavior of the synthesis process, and $C_{secondary}$ influences subtle surface behavior and local shape characteristics. Both the primary and secondary cost components are themselves defined as summations of several individual cost components. The categorization of cost components is based on their necessity to the overall solution. The primary cost components are fundamental to the synthesis formulation and are applied to all cases. The secondary components, however, are application dependent. This distinction will be demonstrated through several application examples.

Primary Cost Components

The primary cost is comprised of two components: $C_o$ the cost due to obstacle proximity or interference, and the cost due to surface area. The obstacle cost component $C_o$ requires a function to determine the distance from an arbitrary point to an obstacle model. The sophistication of such a distance function is dictated by the complexity of the obstacle model. Since surface synthesis is intended as a tool for conceptual design, the present invention considers only convex polyhedral obstacle models.

Given an obstacle model Q comprised of V vertices, a distance function $D_{ij} = \text{dist}(S(u_i, v_j)Q)$ is formulated such that the distance from the point $S(u_i, v_j)$ to each polygonal face of Q is computed, and the minimum is returned. The actual implementation employs both bounding box and face orientation culls to enhance computational efficiency. In addition, the function $D_{ij}$ is designed to return a negative value if $S(u_i, v_j)$ is inside Q and a positive value otherwise. The obstacle proximity cost component is thus defined as, $$C_0 = \sum_{i=0}^{M-1} \sum_{j=0}^{N-1} C_{ij}, \tag{7}$$

with $$C_{ij} = \begin{cases} K_1 & \text{if } D_{ij} \leq 0 \\ K_2(\delta - D_{ij}) & \text{if } 0 < D_{ij} \leq \delta \\ 0 & \text{if } \delta < D_{ij} \end{cases}$$

where $K_1$ and $K_2$ are positive constants used to control the relative emphasis of $C_0$ with respect to the total configuration cost. Note that if the distance is greater than the assigned tolerance then the associated cost is zero. When the surface point is within the tolerance region then the cost is computed such that it is greatest at the obstacle boundary and zero on the outer boundary of the tolerance zone.

To counteract the expansion effect of $C_0$, an area penalty is formulated as follows. The surface area of a parametric surface is defined (Mortensen, 1985) by, $$\text{Area }(S(u,v)) = \iint |S^u(u,v) \times S^v(u,v)| du dv \tag{8}$$

and can be calculated approximately via Gaussian quadrature. Thus a simple area penalty cost component is formulated as, $$C_a = K_3 \{Area(S(u,v))\} \qquad (9)$$

where $K_3$ is a positive constant.

Preliminary experimentation with this formulation revealed that a large portion of the computation time was expended in calculating the area cost, $C_a$. To reduce this computational burden, an alternative component was developed which generates a similar effect with far fewer computations. In a parametric surface model, if one parameter is held constant while the other parameter is varied through its range, a curve is generated which lies in the surface. A cost function component $C_1$ which penalizes the length of these constant parameter curves is thus defined as, $$C_1 = K_4 \left\{ \sum_{j=0}^{N-1} L_{uj} + \sum_{i=0}^{M-1} L_{vi} \right\} = K_4 C_{arc} \qquad (10)$$

where, $$L_{uj} = \sum_{i=0}^{M-2} |S(u_{i+1},v_j) - S(u_i,v_j)|$$

$$L_{vi} = \sum_{j=0}^{N-2} |S(u_i,v_{j+1}) - S(u_i,v_j)|$$

Note that at each sample point, $C_a$ requires evaluation of both surface parametric derivatives and calculation of their cross products, while $C_1$ is a function only of surface point evaluations. In addition, since surface point evaluations are necessary for $C_0$, they need not be re-calculated for $C_1$. The SA algorithm typically requires many cost function evaluations. Thus any improvement in the efficiency of the cost function should have a dramatic effect on the overall computation time.

Figure 2A:
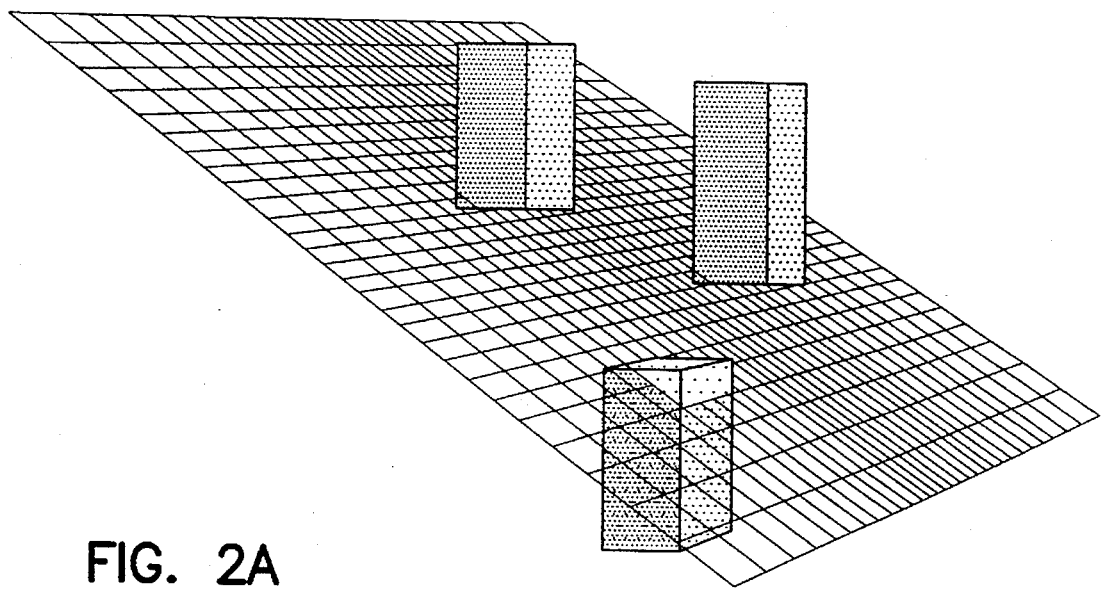
FIG. 2A shows an initial configuration of a NURBS surface with respect to three obstacles.

For general synthesis problems involving multiple obstacles and a large number of control points (and thus many degrees of freedom) the arc-length cost component was insufficient to inhibit undesirable divergence of the SA solution. The cost function formulation described above proved to be adequate for simple surface synthesis problems. However, when more general problems were attempted with this cost function, the SA failed to converge to a reasonable solution. For example, FIG. 2A depicts a design environment with three obstacles and a single uniform, non-rational B-spline surface defined by a 7×7 grid of control points in an initially planar configuration. In this experiment the edge control points were specified as fixed, and the twenty-five interior points were allowed to vary.

Using the initial cost function formulation, many experiments were conducted with a variety of combinations of different values for cost component constants, neighborhood magnitude (i.e., maximum perturbation size), and SA algorithm parameters. In spite of these attempts, all of these experiments resulted in divergent solutions similar to the one shown in FIG. 2B.

Figure 2B:
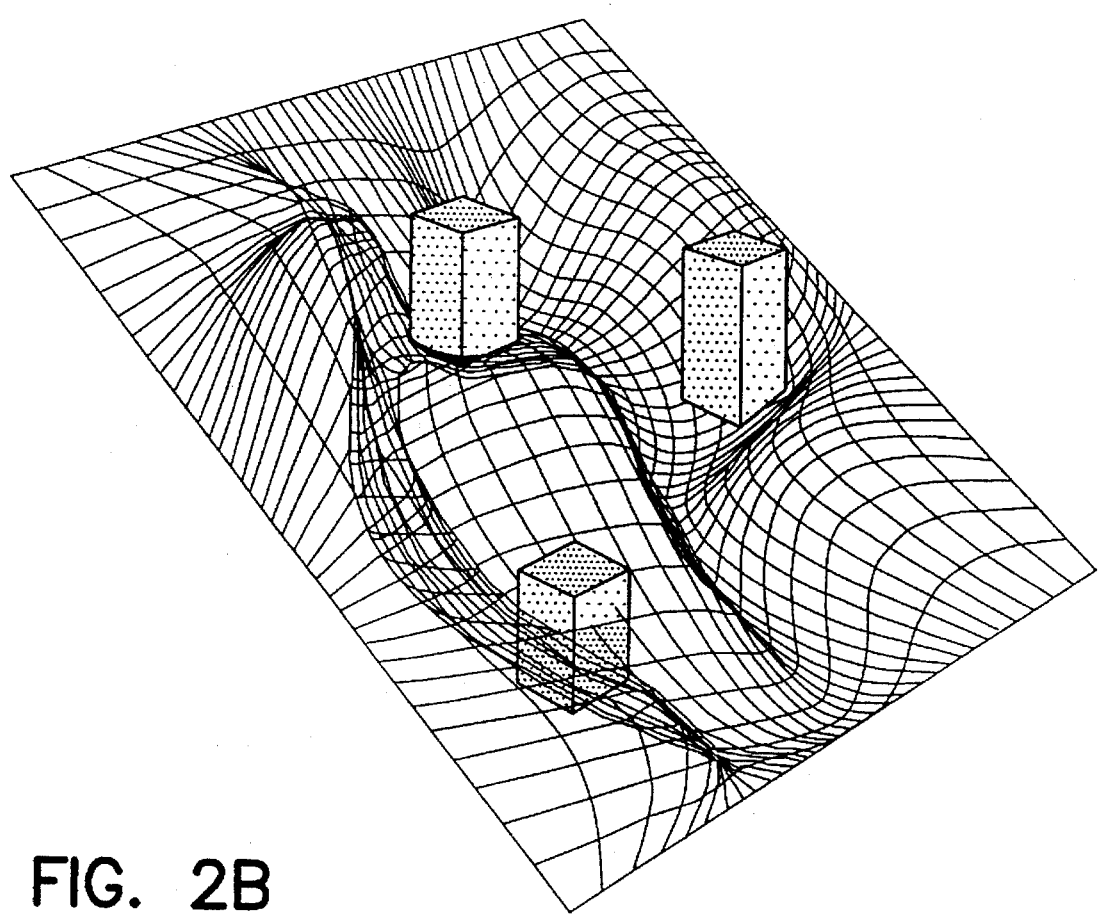
FIG. 2B illustrates a divergent solution of a NURBS surface synthesis.

It is apparent from FIG. 2B (and the results of many similar experiments) that there is sufficient freedom in the system such that the control points are allowed to cross spatially which results in self intersections and the folded appearance of the surface. Thus, an additional cost function component was developed to inhibit this behavior. Since it is generally desirable to maintain the topological structure of the surface, a penalty on topological change was desired. A first attempt was to enforce the orthogonality of surface tangent vectors. Thus, a tangent vector orthogonality cost was defined as ($C_{ortho}$). This cost component, described below, penalizes u and v direction tangent vectors which approach parallel or anti-parallel relative orientations. It was hoped that this penalty would enforce the rectangular topology of the surface, and inhibit the folding behavior exhibited by the initial cost function.

Experiments with this enhanced form of the cost function indicated that the orthogonality cost component was insufficient to inhibit the undesirable behavior. In fact, it tended to have a detrimental effect on the overall solution. During the early stages of the SA the neighborhood magnitude is at its largest, the system has high energy, and it is likely to accept higher cost moves. In this condition, it was found that the system would often accept a state with relatively high orthogonality cost and, on the next perturbation, reach a lower cost state with the tangent vectors in reversed orientation (i.e., the surface normal would change directions). As temperature decreases, the tendency to accept higher cost moves decreases, so the creases and folds so induced tended to "freeze" into the surface. It was observed that the orthogonality cost had the desired effect of enforcing a general rectangular topology, but generally not until the global solution had been reached, i.e., its effect was relatively subtle, and noticeable only in the later stages of the SA.

Since the intended global effect was to inhibit an orientation change in surface normal vectors, a second reformulation focused directly on this effect. A surface normal can be calculated from the cross product of the first parametric derivatives, $$n = S^u(u,v) \times S^v(u,v) \qquad (11)$$

In order to detect an orientation change in surface normal direction, some reference orientation must be applied. Two separate cost function components were developed, each based on a different definition for the reference direction. The first one employed a global static reference normal vector. In this formulation, the reference normal $n_r$ was defined as normal to the plane in which the control points were initially defined (oriented parametrically via Eq. 10). The cost component to inhibit surface twist $C_{twist}$ was then implemented by calculating the scalar product $n_r$ with each $n_{ij}$ in the M×N rectangular grid of sampled surface points, i.e., $$C_{twist} = \sum_{i=0}^{M-1} \sum_{j=0}^{N-1} C_{t_{ij}} \qquad (12)$$

$$C_{t_{ij}} = \begin{cases} 0 & \text{if } n_r \cdot n_{ij} > 0 \\ K_6 & \text{if } n_r \cdot n_{ij} < 0 \end{cases} \qquad (13)$$

Normal vector orientation change, as indicated by sign change in the scalar product, was thus penalized accordingly. Experimentation with this cost component incorporated with $C_o$, $C_l$, and $C_{ortho}$ yielded inconclusive results. In some cases the twist penalty had a slightly beneficial effect in that the divergence was somewhat delayed, but none of the experiments yielded acceptable results.

While $C_{twist}$ seemed to have only a mild effect on the design configuration of FIG. 2A, it proved to be much too restrictive in more general synthesis problems. Consider, for example, a case in which the general configuration of the surface is U-shaped, or even closed in one parametric direction. In such cases, the global initial reference normal is much too restrictive, and generally inhibits the desired shape.

To address this problem the second formulation of $C_{twist}$ employed a local incremental reference normal vector. In particular, at each step of the SA, each $n_{ij}$ was dotted with its corresponding normal from the previous step. It was hoped that this would represent a more accurate penalty on normal orientation change. However, experimentation proved otherwise, as this formulation was also ineffective. The apparent limitation was the situation in which, at the higher temperatures (and thus larger neighborhood magnitudes), between successive SA steps, a legitimate spatial change in normal orientation often occurred simultaneously with an illegitimate reorientation of tangent vectors, thus the reorientation was not detected.

In addition to these discouraging results, it was apparent that both formulations for $C_{twist}$ added substantial computational burden to the overall algorithm, due to the repeated calculation of surface derivatives. The final alternative was to drop the twist cost component altogether and re-formulate the length cost. Obviously, the undesirable twisting effect also affected $C_1$, but repeated attempts at increasing the influence of $C_1$ through manipulation of $K_4$ proved to be ineffective. Consequently, $C_1$ was re-formulated to reflect the quadratic behavior of $C_a$, $$C_1 = K_4 (C_{arc})^2 \tag{14}$$

Figure 3:
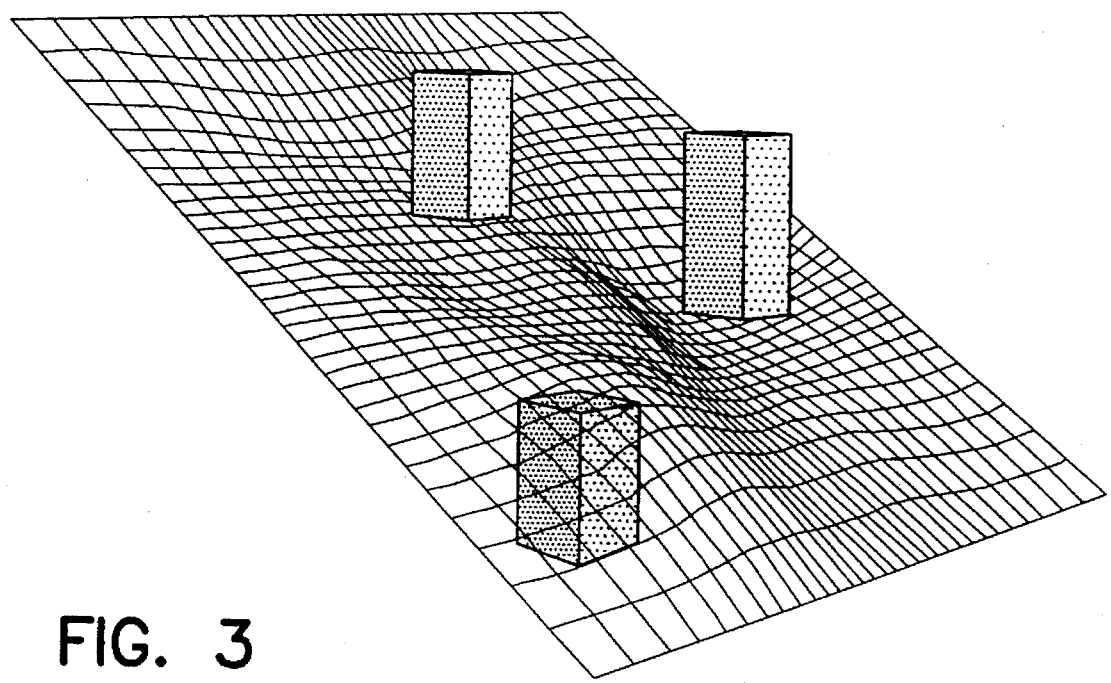
FIG. 3 is a final configuration of NURBS surface using the process of the present invention, given the initial configuration of FIG. 2A.

In subsequent experiments, this arc length cost yielded good results with reasonable computational effort, and was thus deemed preferable for other applications. Combining this component with $C_o$ and $C_{ortho}$ and the constant assignments of $K_1 = 400.0$, $K_2 = 600.0$, $K_4 = 0.07$, and $K_5 = 4.0$, the design configuration of FIG. 2A was synthesized into the surface model shown in FIG. 3 in 4002 seconds and 12457 cost function evaluations. This combination of cost components has proven to be robust in solving a variety of general synthesis problems and will form the basis for future research in surface synthesis.

Secondary Cost Components

In certain applications, the primary cost components operating alone are insufficient to maintain the initially rectangular topological structure of the surface. In other words, during the annealing procedure, the control points sometimes diverge to such an extent that the underlying surface becomes grossly distorted resulting in self intersections and other topological anomalies. In such extreme cases, the simulated annealing algorithm tends to freeze in a non-optimal state. To inhibit this behavior, a parametric cost component $C_p$ is introduced. This cost component tends to enforce a relatively uniform relationship between variations in the parameter and the corresponding spatial variations, $$C_{pu} = K_5 \sum_{i=0}^{M-2} \sum_{j=0}^{N-1} |\{|S(u_{i+1},v_j) - S(u_i,v_j)| - L_{uj}/(M-1)\}| \tag{15}$$

$$C_{pv} = K_6 \sum_{i=0}^{M-1} \sum_{j=0}^{N-2} |\{|S(u_i,v_{j+1}) - S(u_i,v_j)| - L_{vi}/(N-1)\}|$$

$$C_p = C_{pu} + C_{pv}$$

where $K_5$ and $K_6$ are positive constants. The parametric cost has the overall effect of inhibiting the close proximity of neighboring control points. Note that the two constituents of $C_p$ are independent. Thus, by varying $K_5$ and $K_6$ the effect of $C_p$ on the surface in each parametric direction can controlled independently.

Independent control, however, may not always be desirable. For example, $C_p$ could yield a low cost, and yet control points from topologically orthogonal parametric directions could become quite close, causing surface degeneracies similar to those described above. Thus, another method for enforcing a regular surface topology is to penalize nonorthogonality of surface tangent vectors. A cost component $C_{ortho}$ is thus defined as, $$C_{ortho} = \sum_{i=0}^{M-1} \sum_{j=0}^{N-1} C_{orij}, \tag{16}$$

where, $$C_{orij} = \begin{cases} 0 & \text{if } 0 \leq |S^u(u_i,v_j) \cdot S^v(u_i,v_j)| \leq \delta_0 \\ K_7 & \text{if } |S^u(u_i,v_j) \cdot S^v(u_i,v_j)| > \delta_0 \end{cases}$$

This cost component penalizes u- and v-direction tangent vectors which approach parallel or anti-parallel relative orientations. The parameter $\delta_0$ is a threshold parameter which allows for the specification of a degree of non-orthogonality to be tolerated without penalty. Experiments indicate that the orthogonality cost has the desired effect of enforcing a general rectangular topology, but generally not until the global solution had been reached, i.e., its effect is relatively subtle, and noticeable only in the later stages of the SA.

Note that the combined effect of $C_1$, $C_p$ and $C_{ortho}$ tends to inhibit crossover of the control points and allows for the maintenance of topologically rectangular surface.

One final secondary cost component is motivated by applications in which the symmetry of the final product can be exploited to reduce problem size. This is analogous to a common procedure employed in finite element analysis of symmetric structures. In this application, one parametric direction is assigned in the plane of symmetry, and tangent vectors in the other parametric direction are induced to remain perpendicular to the plane of symmetry. Thus, $C_{sym}$ is defined as a sum of tangent deviations from symmetry plane perpendicularity. The precise formulation of $C_{sym}$ is application dependent. But, unlike all other cost components, $C_{sym}$ is a sum of properties in only a local region of the surface, not the entire surface. Associated with this cost component there is a constant parameter $K_8$.

EXAMPLE APPLICATIONS

Three example surface synthesis problems are presented to demonstrate the capability and generality of the technique. All reported computation times reflect implementation of the invention on a Silicon Graphics Indigo workstation with 48 MB of RAM.

As input the SA algorithm requires the specification of the scalar parameters ($K_i$) associated with each cost component as well as the various parameters that control the SA algorithm itself, e.g., neighborhood size, acceptance rate, number of inner loop iterations, etc. In the following examples these input parameters were selected based on a qualitative assessment of the desired surface behavior, and the combined experience of the users.

Other inputs include the size (i.e., number of control points), polynomial degrees, surface topology, and location of the initial surface model, as well as the number of sample points (M and N). Currently, these inputs are also based on the desired design behavior and user experience. The number of samples is selected based on a heuristic relating obstacle sizes to the design surface size. Preliminary research toward automated selection of initial surface size is addressed by Oliver (1992).

Example 1

The first synthesis example involves a non-rational B-spline surface with a 7×7 control point grid, in a design environment that consists of three obstacles as shown in FIG. 2. The cost components employed in this example are $C_0$, $C_1$ and $C_{ortho}$. The associated constant parameters are $K_1=400.0$, $K_2=600.0$, $K_4=0.7$ and $K_7=4.0$. The initial configuration shown in FIG. 3 was synthesized into the surface model shown in FIG. 5 in 4002 seconds and 12457 cost function evaluations.

Example 2

Figure 4:
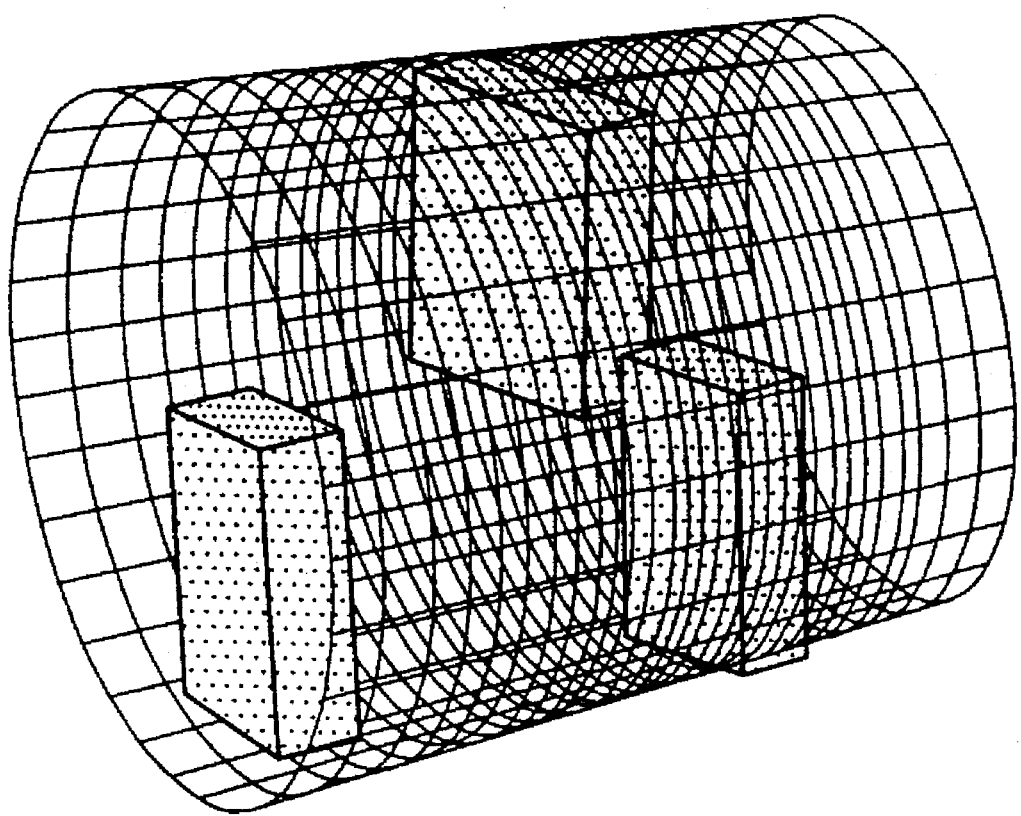
FIG. 4 is an initial cylindrical configuration of a NURBS structure with three obstacles.

The second example demonstrates the generality of the surface synthesis technique. A rational B-spline is useful for the exact representation of natural quadrics. In fact, one of the most common uses of the rational form is the representation of circular curves and cylindrical surfaces (Piegl and Tiller, 1987). FIG. 4 shows a cylindrical NURBS surface in the vicinity of three obstacles. This surface is defined as quadratic in the circumferential direction and cubic in the axial direction. It was specified by a grid of nine control points in the circumferential direction (distributed about a square of side length equal to the cylinder diameter) by eight control points equally spaced in the axial direction.

The knot vector and weight assignments in the circumferential direction were specified to reflect the desired cylindrical shape (see, for example, Piegl and Tiller, 1987) while in the axial direction a uniform knot vector was specified and the control point weights were set equal to one.

Figure 5:
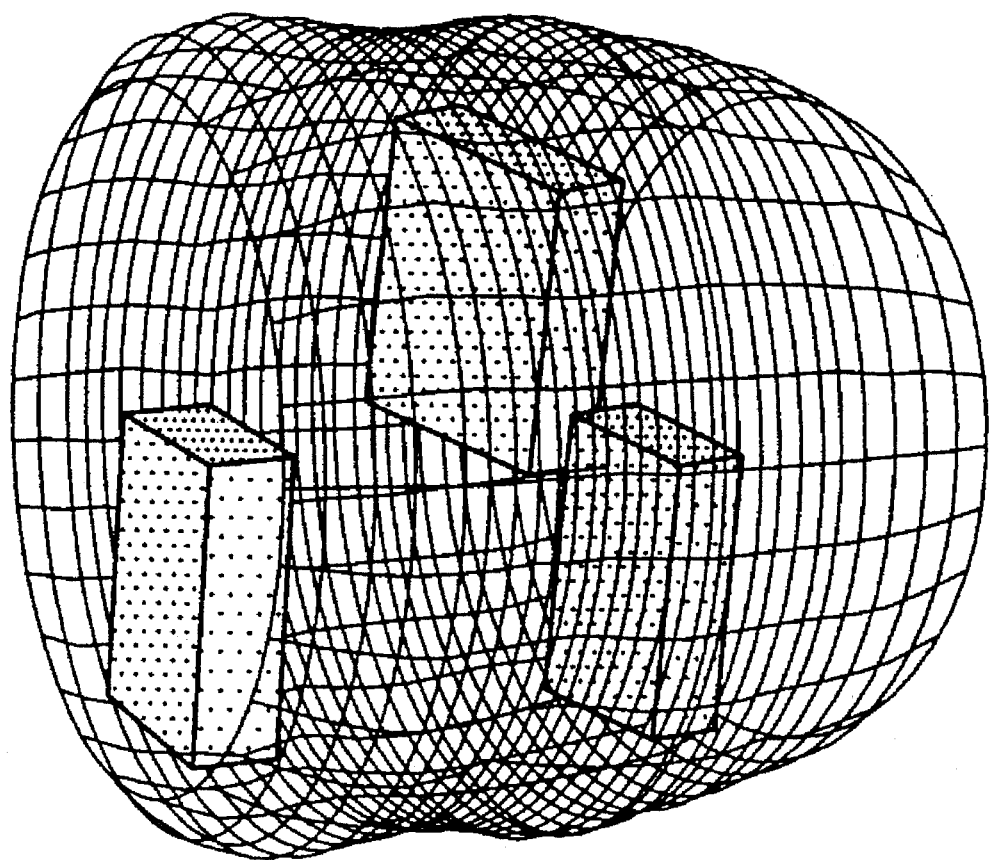
FIG. 5 shows a final axisymmetric configuration of the tubular surface of FIG. 4 obtained using the process of the present invention.

For the first solution of this example design configuration the circular cross-section was to be maintained. Thus the control points were restricted to move only in radial planes. (Since this constraint rendered the cost component $C_{ortho}$ ineffective, it was not included in the cost function.) In addition, in each radial plane, the control points were perturbed such that the square shape of the control point net was maintained, thus maintaining the circular cross section of the surface (i.e., each square was either randomly enlarged or reduced in size). Finally, the control points on both ends of the cylinder were specified as fixed. Using cost component parameters of $K_1=10.0$, $K_2=60.0$, and $K_4=1.0$, the result of this synthesis example is shown in FIG. 5. This solution was reached in 1155 seconds and 4600 cost function evaluations.

The axisymmetric surface in FIG. 5 is a direct result of the restrictions placed on the mobility of the free control points. In a second experiment with this configuration, the axisymmetric constraint was relaxed, i.e., the control points were still constrained to radial planes, but they were free to move anywhere within the plane. The results of this example are shown in FIGS. 6A and 6B. As expected, this surface exhibits a more localized response to the imposed constraints. This result was reached with cost component parameters specified as $K_1=50.0$, $K_2=100.0$, and $K_4=0.2$, in 3738 seconds and 12856 cost function evaluations.

Example 3

This example was chosen to demonstrate one of the potential applications of this surface synthesis technique. FIG. 7 shows the initial configuration of the surface in the vicinity of two (contacting) obstacles which are intended to represent the interior compartment of a toy model automobile. Only half the car surface is synthesized due to symmetry. The surface is a non-rational bi-cubic B-spline with 7×10 control points.

Figure 8A:
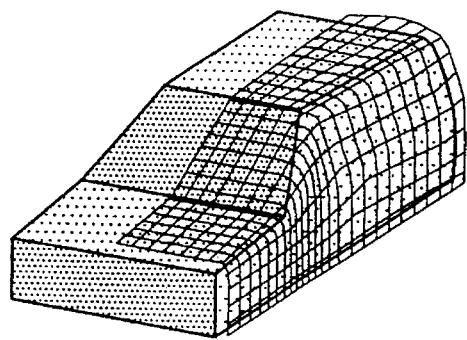
FIGS. 8A and 8B show two views of a final configuration of a car surface obtained using the surface synthesis process of the present invention.
Figure 8B:
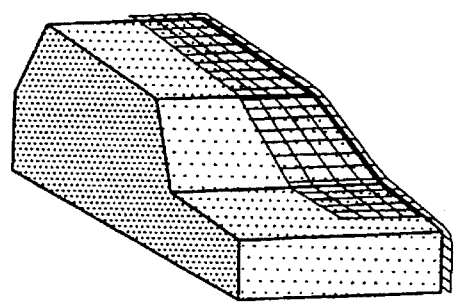

The coordinate system is defined such that the x-axis is in the axial direction, the y-axis in the lateral direction and the z-axis ground-up. The control points at the lower edge of the surface are fixed. Most of the control points are constrained in the axial direction of the car. The control points at the top edge of the surface are constrained in the axial as well as the lateral direction. The tangent vectors at the plane of symmetry (xz-plane) were constrained to a zero slope in the z-direction. The cost components used in this example are $C_0$, $C_1$, $C_{sym}$, and $C_p$. The parameters associated with the cost components are $K_1=30$, $K_2=30$, $K_4=0.04$, $K_5=0$, $K_6=5$ and $K_8=1$. The final solution, is shown in FIGS. 8A and 8B.

System Hardware and Software

Figure 9:
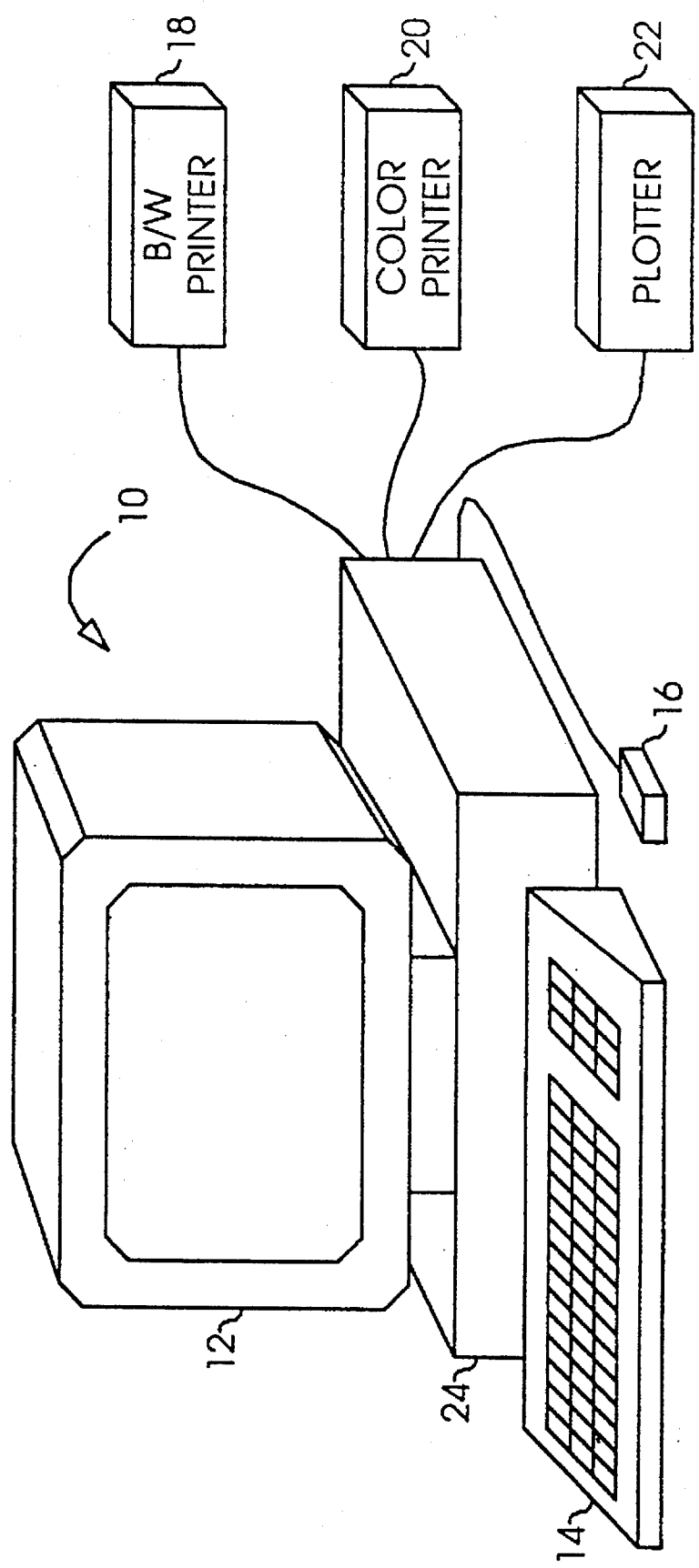
FIG. 9 illustrates the hardware components of the system of the present invention.
Figure 10A:
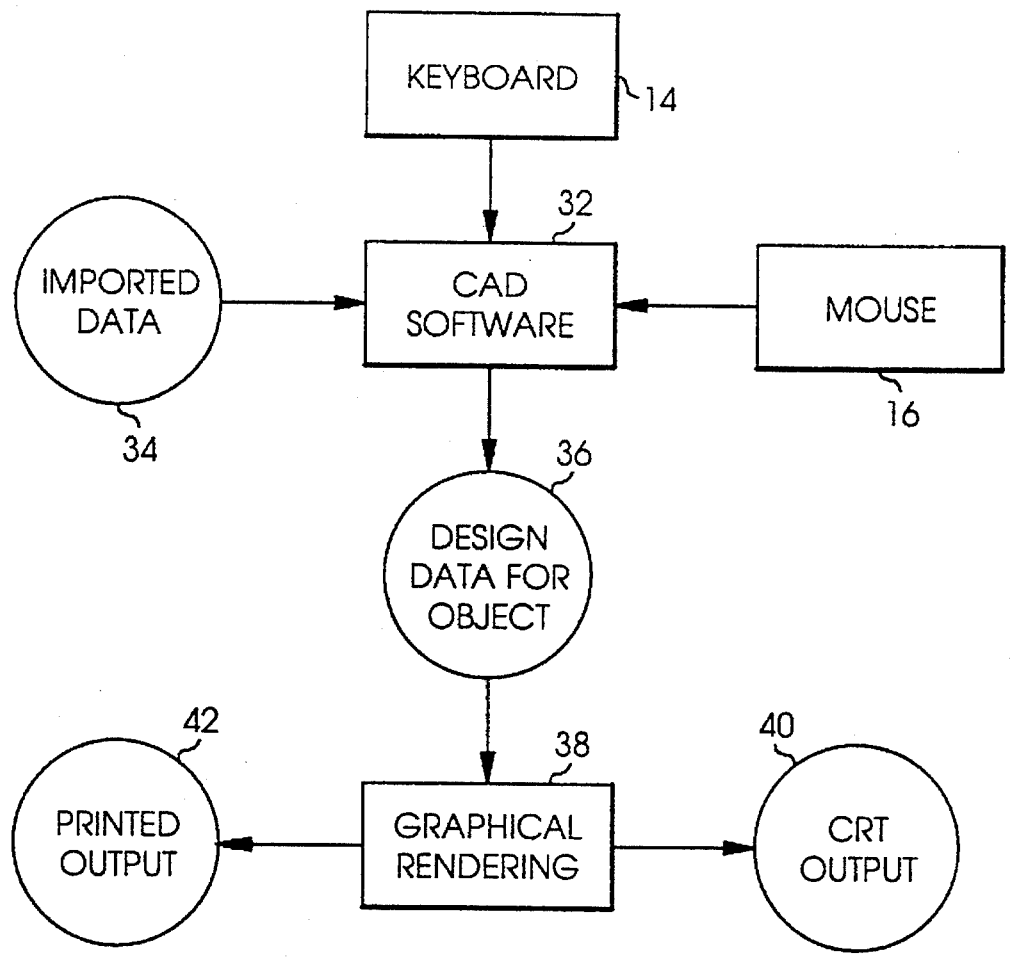
FIGS. 10A and 10B are simplified block diagrams of a computer aided design system according to the present invention.
Figure 10B:
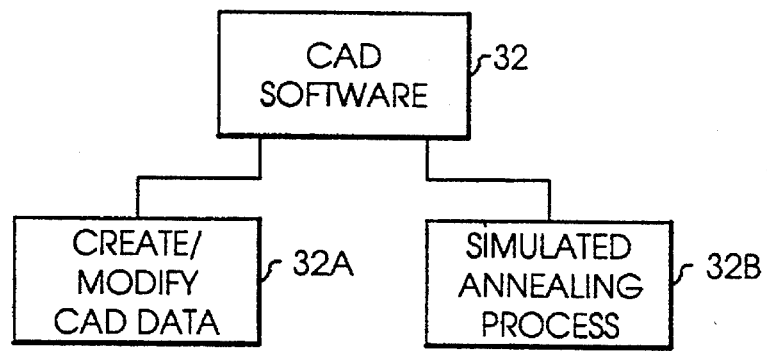

The hardware system of the present invention and a software implementation of the simulated annealing system of the present invention are illustrated in FIGS. 9–12. As shown in FIG. 9, the system includes a workstation 10 (for example a Silicon Graphics Indigo/Elan workstation with a UNIX operating system) including a monitor 12, keyboard 14, mouse 16, black and white printer 18, color printer 20, and printer/plotter 22. Housed in chassis 24 are various other system components including the CPU and other supporting processors, mass storage and random access memory (RAM). To create and/or modify designs of objects for which surfaces are to be configured, the workstation 10 may be programmed with CAD or solid or geometric modelling software (hereinafter referred to as "CAD software") 30, as illustrated in simplified block diagram form in FIGS. 10A and 10B. CAD software 30 includes routines and modules 32 for creating and modifying design data representing a design object (32A) and for executing the simulated annealing process (32B). Software 32 receives input from the keyboard 14 and mouse 16 for this purpose. Software 32 can also import object design data from another source 34, such as a file developed on another system. Software 32, operating on the workstation, produces design data 36 (preferably in a NURBS format), which can be rendered graphically by software routines and modules 38, which produce CRT or printed output 40 and 42 respectively.

Figure 11:
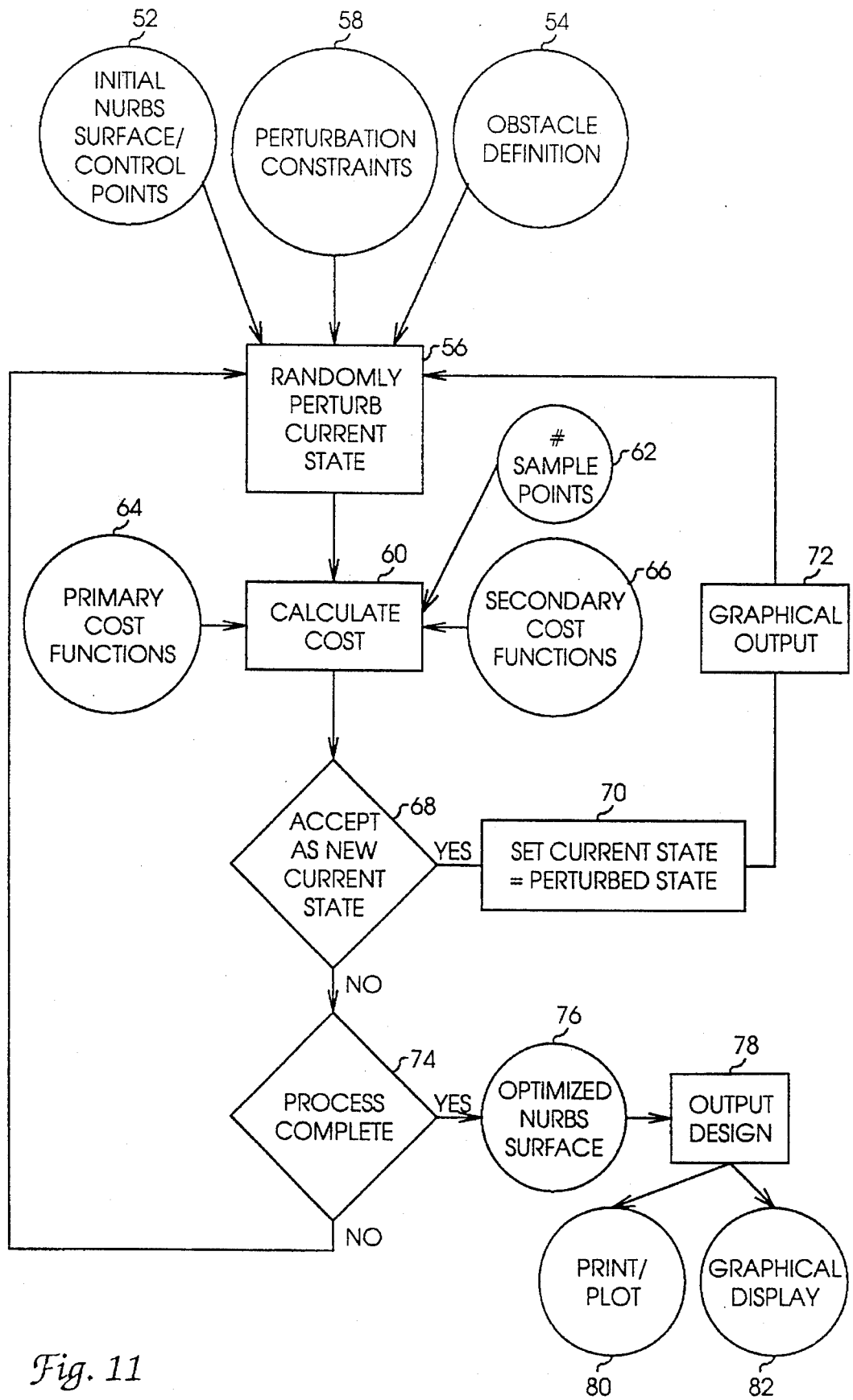
FIG. 11 is a simplified flow chart of the simulated annealing processing according to the present invention.

Referring now to FIG. 11, there is illustrated in simplified flow chart form the simulated annealing process and software 32B of the present invention as described above. An initial (current) NURBS surface (52) to be optimized, including control points, and an obstacle definition (54) are provided to a perturbing routine 56. The current state of the NURBS surface is perturbed randomly, based on any constraints 58. The cost of the perturbed surface is calculated (60), based on the number of sample points (62), the primary cost functions (64), the secondary cost functions (66), and any other constraints or cost functions as may be desireable. At decision point 68, the perturbed surface is accepted (70) if its cost meets one or more certain predetermined criteria, for example, if it has a lower cost than the current state or on a probability based on the current temperature. Otherwise, flow proceeds to decision block 74 determine if the simulated annealing process is complete, i.e., the best optimization has been obtained given the system constraints. If the process is complete, the optimized NURBS surface (76) is accepted. A graphical output routine 78 provides for a printed or plotted output 80, or a graphical display on a CRT 82. A complete computer program, written in the C language, to accomplish the functions of software 32A, is listed in the Microfiche Appendix hereto.

Figure 12:
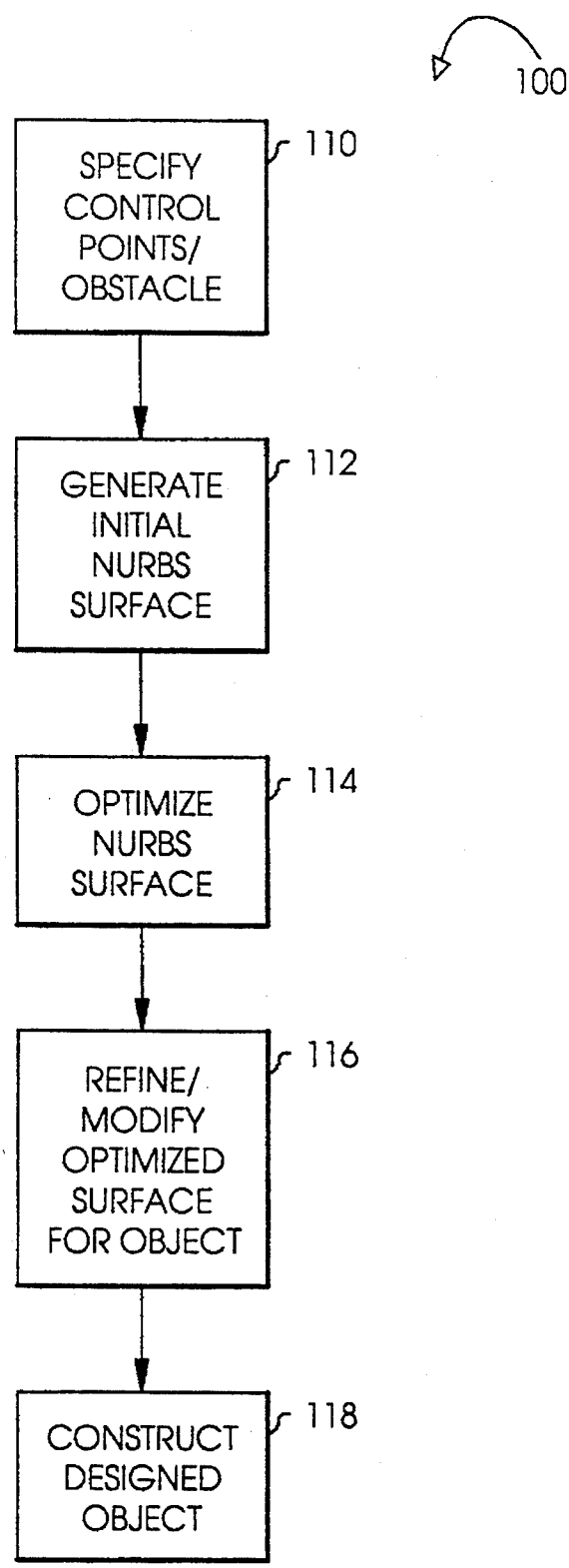
FIG. 12 is a simplified flow chart of the design system and process according to the present invention.

Referring now to FIG. 12, the overall design process 100 of the present invention is illustrated. The process assumes a starting set of control points and an obstacle to be avoided (110). An initial NURBS surface is generated using the control points (112). This initial surface is optimized using the simulated annealing system described above (114). The optimized surface is then refined and modified to create a final design object such as the body of an automobile (116). The process is then completed by the construction of the designed object.

It is an object of the present invention that it will form the basis of a completely automated system for the synthesis of sculptured surface models. Such a tool is not envisioned to provide a highly precise, production-ready surface model, but rather an initial model that globally satisfies many known constraints. This would provide surface designers with a rapid analytical prototyping facility, which would foster experimentation with novel configurations and enhance creativity.

Another area of use for the present invention is the characterization of general design and manufacturability constraints in terms of analytical surface properties. One manufacturability constraint being considered is a formability constraint which is referred to in co-pending application Ser. No. 08/108,194, filed on Aug. 17, 1993, and entitled "An Area Preserving Transformation System for Press Forming Blank Development," by Oliver et al. This can be incorporated as another cost function component. Some other constraints to be considered include curvature constraints on die machinability, aesthetic constraints based on isophotes (Poeschl, 1984), and/or surface fairness (Ferguson et al., 1988).

Finally, although the computation times reported for the examples presented are not excessive, efficiency improvements would certainly enhance the viability of this surface synthesis methodology. The use of other optimization techniques such as genetic algorithms and/or hybrid techniques may also be useful.

REFERENCES

Böhm, W., Farin, G. and Kahmann, J., 1984, "A Survey of Curve and Surface Methods in CAGD," Computer Aided Geometric Design, Vol. 1, pp. 1–60.

Böhm, W., 1984, "Efficient Evaluation of Splines," Computing, Vol. 33, pp. 171–177.

Casale, M. S. and Bobrow, J. E., 1989, "A Set Operation Algorithm for Sculptured Solids Modeled with Trimmed Patches," Computer Aided Geometric Design, Vol. 6, pp. 235–247.

Celinker, G. and Gossard, D., 1991, "Deformable Curve and Surface Finite Elements for Free-Form Shape Design," Computer Graphics (Proceedings of SIGGRAPH'91), Vol. 25, No. 4, pp. 257–266.

Cohen, E., Lyche, T. and Riesenfeld, R. F., 1980 "Discrete B-splines and Subdivision Techniques in Computer Aided Geometric Design" Computer Graphics and Image Processing, Vol. 14, No. 2, pp. 87–111.

Corana, A., Marchesi, M., Martini, C. and Ridella, S., 1987, "Minimizing Multimodal Functions of Continuous Variables with the Simulated Annealing Algorithm," ACM Transactions on Mathematical Software, Vol. 13, No. 3, pp. 262–280.

Cox, M., 1972, "The numerical Evaluation of B-splines," Journal of the Institute of Mathematics Applications, Vol. 10, pp. 134–149.

de Boor, C., 1972, "On Calculating with B-splines," Journal of Approximation Theory, Vol. 6, pp. 50–62.

Devadas, S. and Newton, A. R., 1987, "Topological Optimization of Multiple-Level Array Logic," IEEE Transactions on Computer-Aided Design, Vol. CAD-6, No. 6, pp. 915–941.

Elperin, T., 1988, "Monte Carlo Structural Optimization in Discrete Variables with Annealing Algorithm," International Journal for Numerical Methods in Engineering, Vol. 26, pp. 815–821.

Farin, G., 1988, Curves and Surfaces for Computer Aided Geometric Design, Academic Press, San Diego.

Farouki, R. T. and Rajan, V., 1987, "On the Numerical Condition of Polynomials in Bernstein Form," Computer Aided Geometric Design, Vol. 4, pp. 191–216.

Faux, I. D. and Pratt, M. J., 1979, Computational Geometry for Design and Manufacture, Ellis Horwood Ltd., Chichester.

Ferguson, D. R., Frank, P. D. and Jones, A. K., 1988, "Surface Shape Control Using Constrained Optimization on the B-Spline Representation," Computer Aided Geometric Design, Vol. 5, pp. 87–103.

Jain, P. and Agogino, A. M., 1988, "Optimal Design of Mechanisms Using Simulated Annealing: Theory and Applications," ASME Advances in Design Automation, S. S. Rao, ed., DE-Vol. 14, pp. 233–240.

Kim, K. and Biegel, J. E., 1988, "A Path Generation Method for Sculptured Surface Manufacture," Computers in Industrial Engineering, Vol. 14, No. 2, pp. 95–101.

Kirkpatrick, S., Gelatt, C. D., and Vecchi, M. P., 1983, "Optimization by Simulated Annealing," Science, Vol. 220, No. 4598, pp. 671–680.

Laarhoven, P. J. M., van, and E. H. L. Aarts, 1987, Simulated Annealing: Theory and Applications, Kluwer Academic Publishers, Massachusetts.

Lee, E. T. Y., 1983, "A Simplified B-spline Computation Routine," Computing, Vol. 29, pp. 365–371.

Malhotra, A., Oliver, J. H., and Tu, W., 1991, "Synthesis of Spatially and Intrinsically Constrained Curves," ASME Advances in Design Automation, DE-Vol. 32-1, G. Gabriele, ed., pp. 145–155, (also to appear, ASME Transactions, Journal of Mechanical Design).

Mortenson, M. E., 1985, Geometric Modeling, Wiley, New York.

Nair, N. K. and Oliver, J. H., 1993, "An Area Preserving Transformation Algorithm for Press Forming Blank Development," to appear ASME Advances in Design Automation Conference, Albuquerque, N.Mex., September, 1993.

Oliver, J. H., 1992, "Recent Advances in Constrained B-spline Synthesis," Proceedings of NSF Design and Manufacturing Systems Conference, Atlanta, Ga., pp. 387–393.

Oliver, J. H. and Theruvakattil, P., 1992, "Chapter 3: Automated Generation of Sculptured Surface Models," to appear, Artificial Intelligence in Optimal Design and Manufacturing, Z. Dong, ed., Prentice Hall Environmental and Intelligent Manufacturing Systems Series, M. Jamshidi, Series ed.

Piegl, L. and Tiller, W., 1987, "Curve and Surface Constructions Using Rational B-splines," Computer Aided Design, Vol. 19, No. 9, pp. 485–498.

Piegl, L., 1989, "Modifying the Shape of Rational B-Splines. Part 2: Surfaces," Computer Aided Design, Vol. 21, No. 9, pp. 538–546.

Piegl, L., 1991, "On NURBS: A Survey," IEEE Computer Graphics and Applications}, Vol. 11, No. 1, pp. 55–71.

Poeschl, T., 1984, "Detecting Surface Irregularities Using Isophotes," Computer Aided Geometric Design, Vol. 1, pp. 163–168.

Rutenbar, R. A., 1989, "Simulated Annealing Algorithms: An Overview," IEEE Circuits and Devices, January, pp. 19–26.

Saia, A., Bloor, M. S. and dePennington, A., 1989, "On the Integration of Parametric Polynomial Surface Representations into CSG Based Solid Modeling," ASME Advances in Design Automation, B. Ravani, ed., DE-Vol. 19-1, pp. 121–127.

Sandgren, E. and Venkataraman, S., 1989, "Robot Path Planning via Simulated Annealing: A Near Real Time Approach," ASME Advances in Design Automation, B. Ravani, ed., DE-Vol. 19-1, pp. 345–351.

Terzopoulos, D., Platt, J., Barr, A. and Fleischer, K., 1987, "Elastically Deformable Models," Computer Graphics (Proceedings of SIGGRAPH'87), Vol. 21, No. 4, pp. 205–214.

Wysocki, D. A., Oliver, J. H. and Goodman, E. D., 1989, "Gouge Detection Algorithms for Sculptured Surface NC Generation," ASME Computer-Aided Design and Manufacture of Cutting and Forming Tools, PED-Vol. 40, pp. 39–44, (also, to appear, Transactions of the ASME, Journal of Engineering for Industry).

I claim:

1. A method of computer-aided-design (CAD) using a CAD system including one or more electromechanical input devices, a storage device and a graphical display device, comprising the steps of:

(a) using the one or more electromechanical input devices, entering design instructions and specifications into the CAD system to specify a surface under design, the CAD system displaying on the graphical display device a three-dimensional representation of the surface in response to the design instructions and specifications, the surface stored in the storage device in the form of surface data specifying a non-uniform rational B-spline (NURBS) including a plurality of parameters, the surface data initially being a current state of the data;

(b) using the CAD system, automatically reconfiguring the surface to avoid an obstacle in a common frame of reference with the surface, the automatic reconfiguring comprising the steps of:

(1) calculating the cost of the current surface data based on primary and secondary cost functions according to a simulated annealing technique, wherein said primary cost functions comprise a function which measures the distance from the surface to the obstacle and a function which penalizes an expansion of the surface area of the surface, and the secondary cost functions comprise a function which penalizes non-uniformity between variations in the parameters and spacial variations in the surface, and a function which penalizes non-orthogonality of tangent vectors to the surface at different points;

(2) using the CAD system, randomly perturbing the current state of the surface data to generate perturbed surface data;

(3) using the CAD system, calculating the cost of the perturbed surface data based on the primary and secondary cost functions according to the simulated annealing technique;

(4) using the CAD system, comparing the cost of the perturbed surface data to that of the cost for the current state and setting the current state equal to the perturbed surface data if one or more first predetermined criteria are met;

(5) repeating steps (2) through (4) until one or more second predetermined criteria are met wherein the current state is accepted as the final optimized reconfigured state and storing the data for the final optimized reconfigured state in the storage device; and (c) graphically displaying a three-dimensional representation of the final optimized reconfigured state of the surface on the graphical display device and using the one or more electromechanical input devices, entering design commands and specifications into the CAD system to specify one or more further design alterations to the final optimized reconfigured state of the surface to produce a CAD system description of a surface useful for the implementation or production of a physical system, physical object or device in accordance therewith.

2. The method according to claim 1 further wherein the surface is described with parametric equations and has a plane of symmetry along one parametric direction, and the secondary cost functions include a function which induces tangent vectors in the other parametric direction to remain perpendicular to the plane of symmetry.

3. A method of computer-aided-design (CAD) using a CAD system including one or more electromechanical input devices, a storage device and a graphical display device, comprising the steps of:

(a) using the one or more electromechanical input devices, entering design instructions and specifications into the CAD system to specify a surface under design, the CAD system displaying on the graphical display device a three-dimensional representation of the surface in response to the design instructions and specifications, the surface stored in the storage device in the form of surface data specifying a non-uniform rational B-spline (NURBS) including a plurality of parameters, the surface data initially being a current state of the data;

(b) using the CAD system, automatically reconfiguring the surface to avoid an obstacle in a common frame of reference with the surface, the automatic reconfiguring comprising the steps of:

(1) calculating the cost of the current surface data based on a cost function according to a simulated annealing technique, wherein said cost function measures the distance from the surface to the obstacle and penalizes distance;

(2) using the CAD system, randomly perturbing the current state of the surface data to generate perturbed surface data;

(3) using the CAD system, calculating the cost of the perturbed surface data based on the cost function according to the simulated annealing technique;

(4) using the CAD system, comparing the cost of the perturbed surface data to that of the cost for the current state and setting the current state equal to the perturbed surface data if one or more first predetermined criteria are met;

(5) repeating steps (2) through (4) until one or more second predetermined criteria are met wherein the current state is accepted as the final optimized reconfigured state and storing the data for the final optimized reconfigured state in the storage device; and (c) graphically displaying a three-dimensional representation of the final optimized reconfigured state of the surface on the graphical display device and using the one or more electromechanical input devices, entering design commands and specifications into the CAD system to specify one or more further design alterations to the final optimized reconfigured state of the surface to produce a CAD system description of a surface useful for the implementation or production of a physical system, physical object or device in accordance therewith.

4. A method according to claim 3 further wherein there is an additional cost function which penalizes an expansion of the surface area of the surface, and the steps b (1) and b (3) of calculating the cost function include the step of adding the additional cost to a total cost.

5. A method of computer-aided-design (CAD) using a CAD system including one or more electromechanical input devices, a storage device and a graphical display device, comprising the steps of:
(a) using the one or more electromechanical input devices, entering design instructions and specifications into the CAD system to specify a surface under design, the CAD system displaying on the graphical display device a three-dimensional representation of the surface in response to the design instructions and specifications, the surface stored in the storage device in the form of surface data specifying a non-uniform rational B-spline (NURBS) including a plurality of parameters, the surface data initially being a current state of the data;
(b) using the CAD system, automatically reconfiguring the surface to avoid an obstacle in a common frame of reference with the surface and positioned in the frame of reference to interfere with the surface, the automatic reconfiguring comprising the steps of:
  (1) calculating the cost of the current surface data based on a cost function according to a simulated annealing technique, wherein said cost function comprises a function which penalizes an expansion of the surface area of the surface;
  (2) using the CAD system, randomly perturbing the current state of the surface data to generate perturbed surface data;
  (3) using the CAD system, calculating the cost of the perturbed surface data based on the cost function according to the simulated annealing technique;
  (4) using the CAD system, comparing the cost of the perturbed surface data to that of the cost for the current state and setting the current state equal to the perturbed surface data if one or more first predetermined criteria are met;
  (5) repeating steps (2) through (4) until one or more second predetermined criteria are met wherein the current state is accepted as the final optimized reconfigured state and storing the data for the final optimized reconfigured state in the storage device; and
(c) graphically displaying a three-dimensional representation of the final optimized reconfigured state of the surface on the graphical display device and using the one or more electromechanical input devices, entering design commands and specifications into the CAD system to specify one or more further design alterations to the final optimized reconfigured state of the surface to produce a CAD system description of a surface useful for the implementation or production of a physical system, physical object or device in accordance therewith.

6. A method according to claim 5 further wherein there is an additional cost function which penalizes non-uniformity between variations in the parameters and spacial variations in the surface, and the steps b (1) and b (3) of calculating the cost function include the step of adding the additional cost to a total cost.

7. A method of computer-aided-design (CAD) using a CAD system including one or more electromechanical input devices, a storage device and a graphical display device, comprising the steps of:
(a) using the one or more electromechanical input devices, entering design instructions and specifications into the CAD system to specify a surface under design, the CAD system displaying on the graphical display device a three-dimensional representation of the surface in response to the design instructions and specifications, the surface stored in the storage device in the form of surface data specifying a non-uniform rational B-spline (NURBS) including a plurality of parameters, the surface data initially being a current state of the data;
(b) using the CAD system, automatically reconfiguring the surface to avoid an obstacle in a common frame of reference with the surface and positioned in the frame of reference to interfere with the surface, the automatic reconfiguring comprising the steps of:
  (1) calculating the cost of the current surface data based on a cost function according to a simulated annealing technique, wherein said cost function comprises a function which penalizes non-uniformity between variations in the parameters and spacial variations in the surface;
  (2) using the CAD system, randomly perturbing the current state of the surface data to generate perturbed surface data;
  (3) using the CAD system, calculating the cost of the perturbed surface data based on the cost function according to the simulated annealing technique;
  (4) using the CAD system, comparing the cost of the perturbed surface data to that of the cost for the current state and setting the current state equal to the perturbed surface data if one or more first predetermined criteria are met;
  (5) repeating steps (2) through (4) until one or more second predetermined criteria are met wherein the current state is accepted as the final optimized reconfigured state and storing the data for the final optimized reconfigured state in the storage device; and
(c) graphically displaying a three-dimensional representation of the final optimized reconfigured state of the surface on the graphical display device and using the one or more electromechanical input devices, entering design commands and specifications into the CAD system to specify one or more further design alterations to the final optimized reconfigured state of the surface to produce a CAD system description of a surface useful for the implementation or production of a physical system, physical object or device in accordance therewith.

8. A method of computer-aided-design (CAD) using a CAD system including one or more electromechanical input devices, a storage device and a graphical display device, comprising the steps of:
(a) using the one or more electromechanical input devices, entering design instructions and specifications into the CAD system to specify a surface under design, the CAD system displaying on the graphical display device a three-dimensional representation of the surface in response to the design instructions and specifications, the surface stored in the storage device in the form of surface data specifying a non-uniform rational B-spline (NURBS) including a plurality of parameters, the surface data initially being a current state of the data;
(b) using the CAD system, automatically reconfiguring the surface to avoid an obstacle in a common frame of reference with the surface and positioned in the frame of reference to interfere with the surface, the automatic reconfiguring comprising the steps of:
  (1) calculating the cost of the current surface data based on a cost function according to a simulated annealing technique, wherein said cost function penalizes non-orthogonality of tangent vectors to the surface at different points;

(2) using the CAD system, randomly perturbing the current state of the surface data to generate perturbed surface data;

(3) using the CAD system, calculating the cost of the perturbed surface data based on the primary and secondary cost functions according to the simulated annealing technique;

(4) using the CAD system, comparing the cost of the perturbed surface data to that of the cost for the current state and setting the current state equal to the perturbed surface data if one or more first predetermined criteria are met;

(5) repeating steps (2) through (4) until one or more second predetermined criteria are met wherein the current state is accepted as the final optimized reconfigured state and storing the data for the final optimized reconfigured state in the storage device; and (c) graphically displaying a three-dimensional representation of the final optimized reconfigured state of the surface on the graphical display device and using the one or more electromechanical input devices, entering design commands and specifications into the CAD system to specify one or more further design alterations to the final optimized reconfigured state of the surface to produce a CAD system description of a surface useful for the implementation or production of a physical system, physical object or device in accordance therewith.

9. A method according to claim 8 further wherein there is an additional cost function which penalizes non-uniformity between variations in the parameters and spacial variations in the surface, and the steps b (1) and b (3) of calculating the cost function include the step of adding the additional cost to a total cost.

10. A method according to claim 8 further wherein there is an additional cost function which penalizes an expansion of the surface area of the surface, and further wherein the steps b (1) and b (3) of calculating the cost function include the step of adding the additional cost to a total cost.

11. A method according to claims 1, 2, 3, 4, 5, 6, 7, 8, 9, or 10 further comprising the step of constructing a physical object in accordance with the surface data which has been automatically reconfigured.

12. In a computer-aided-design (CAD) system including (a) one or more electromechanical input devices, (b) a graphical display device, (c) a data storage device, (d) means responsive to instructions and specifications entered using the one or more electromechanical input devices for creating and altering surface data specifying a surface under design, reading and writing surface data to the storage device, and using the design data displaying a three-dimensional representation of the surface on the graphical display device so that a user can manually interact with the CAD system to create and alter the surface, whereby the surface data specifying the surface under design can be used to implement or fabricate a physical system, object or device, and wherein the design data specifies the surface as a non-uniform rational B-spline (NURBS) including a plurality of parameters, the improvement comprising:

(e) means for automatically reconfiguring the surface to avoid an obstacle using a simulated annealing process, the obstacle specified by data stored in said storage device and having a common frame of reference with the surface, and wherein the surface data provides the current surface data used in the simulated annealing process comprising:

(1) means for calculating the cost of the current surface data based on primary and secondary cost functions according to the simulated annealing process;

(2) means for randomly perturbing the surface data to generate perturbed surface data;

(3) means for calculating the cost of the perturbed surface data based on the primary and secondary cost functions according to the simulated annealing process;

(4) means for comparing the cost of the perturbed surface data to that of the cost for the current surface data and setting the current state equal to the perturbed surface data if one or more first predetermined criteria are met;

(5) means for accepting a current state as a final optimized reconfigured state when one or more predetermined criteria are met and storing the final optimized reconfigured state on the storage device so that it can be manually altered by a user with the CAD system;

(6) wherein said primary cost functions comprise a function which measures the distance from the surface to the obstacle and a function which penalizes an expansion of the surface area of the surface; and (7) wherein said secondary cost functions comprise a function which penalizes non-uniformity between variations in the parameters and spacial variations in the surface, and a function which penalizes non-orthogonality of tangent vectors to the surface at different points.

13. Apparatus according to claim 12 further wherein the surface is described with parametric equations and has a plane of symmetry along one parametric direction, and the secondary cost functions include a function which induces tangent vectors in the other parametric direction to remain perpendicular to the plane of symmetry.

14. In a computer-aided-design (CAD) system including (a) one or more electromechanical input devices, (b) a graphical display device, (c) a data storage device, (d) means responsive to instructions and specifications entered using the one or more electromechanical input devices for creating and altering surface data specifying a surface under design, reading and writing surface data to the storage device, and using the design data displaying a three-dimensional representation of the surface on the graphical display device so that a user can manually interact with the CAD system to create and alter the surface, whereby the surface data specifying the surface under design can be used to implement or fabricate a physical system, object or device, and wherein the design data specifies the surface as a non-uniform rational B-spline (NURBS) including a plurality of parameters, the improvement comprising:

(e) means for automatically reconfiguring the surface to avoid an obstacle using a simulated annealing process, the obstacle specified by data stored in said storage device and having a common frame of reference with the surface, and wherein the surface data provides the current surface data used in the simulated annealing process comprising:

(1) means for calculating the cost of the current surface data based on a cost function according to the simulated annealing process;

(2) means for randomly perturbing the surface data to generate perturbed surface data;

(3) means for calculating the cost of the perturbed surface data based on the primary and secondary cost functions according to the simulated annealing process;

(4) means for comparing the cost of the perturbed surface data to that of the cost for the current surface data and setting the current state equal to the perturbed surface data if one or more first predetermined criteria are met;

(5) means for accepting a current state as a final optimized reconfigured state when one or more predetermined criteria are met and storing the final optimized reconfigured state on the storage device so that it can be manually altered by a user with the CAD system; and (6) wherein said cost function comprises a function which measures the distance from the surface to the obstacle and penalizes distance.

15. Apparatus according to claim 14 further wherein there is an additional cost function which penalizes an expansion of the surface area of the surface, and the means for calculating the cost function includes means for adding the additional cost to a total cost.

16. In a computer-aided-design (CAD) system including (a) one or more electromechanical input devices, (b) a graphical display device, (c) a data storage device, (d) means responsive to instructions and specifications entered using the one or more electromechanical input devices for creating and altering surface data specifying a surface under design, reading and writing surface data to the storage device, and using the design data displaying a three-dimensional representation of the surface on the graphical display device so that a user can manually interact with the CAD system to create and alter the surface, whereby the surface data specifying the surface under design can be used to implement or fabricate a physical system, object or device, and wherein the design data specifies the surface as a non-uniform rational B-spline (NURBS) including a plurality of parameters, the improvement comprising:

(e) means for automatically reconfiguring the surface to avoid an obstacle using a simulated annealing process, the obstacle specified by data stored in said storage device and having a common frame of reference with the surface, and wherein the surface data provides the current surface data used in the simulated annealing process comprising:

(1) means for calculating the cost of the current surface data based on a cost function according to the simulated annealing process;

(2) means for randomly perturbing the surface data to generate perturbed surface data;

(3) means for calculating the cost of the perturbed surface data based on the primary and secondary cost functions according to the simulated annealing process;

(4) means for comparing the cost of the perturbed surface data to that of the cost for the current surface data and setting the current state equal to the perturbed surface data if one or more first predetermined criteria are met;

(5) means for accepting a current state as a final optimized reconfigured state when one or more predetermined criteria are met and storing the final optimized reconfigured state on the storage device so that it can be manually altered by a user with the CAD system; and (6) wherein said cost function comprises a function which penalizes an expansion of the surface area of the surface.

17. Apparatus according to claim 16 further wherein there is an additional cost function which penalizes non-uniformity between variations in the parameters and spacial variations in the surface, and the means for calculating the cost function includes means for adding the additional cost to a total cost.

18. In a computer-aided-design (CAD) system including (a) one or more electromechanical input devices, (b) a graphical display device, (c) a data storage device, (d) means responsive to instructions and specifications entered using the one or more electromechanical input devices for creating and altering surface data specifying a surface under design, reading and writing surface data to the storage device, and using the design data displaying a three-dimensional representation of the surface on the graphical display device so that a user can manually interact with the CAD system to create and alter the surface, whereby the surface data specifying the surface under design can be used to implement or fabricate a physical system, object or device, and wherein the design data specifies the surface as a non-uniform rational B-spline (NURBS) including a plurality of parameters, the improvement comprising:

(e) means for automatically reconfiguring the surface to avoid an obstacle using a simulated annealing process, the obstacle specified by data stored in said storage device and having a common frame of reference with the surface, and wherein the surface data provides the current surface data used in the simulated annealing process comprising:

(1) means for calculating the cost of the current surface data based on a cost function according to the simulated annealing process;

(2) means for randomly perturbing the surface data to generate perturbed surface data;

(3) means for calculating the cost of the perturbed surface data based on the primary and secondary cost functions according to the simulated annealing process;

(4) means for comparing the cost of the perturbed surface data to that of the cost for the current surface data and setting the current state equal to the perturbed surface data if one or more first predetermined criteria are met;

(5) means for accepting a current state as a final optimized reconfigured state when one or more predetermined criteria are met and storing the final optimized reconfigured state on the storage device so that it can be manually altered by a user with the CAD system; and (6) wherein said cost function comprises a function which penalizes non-uniformity between variations in the parameters and spacial variations in the surface.

19. In a computer-aided-design (CAD) system including
(a) one or more electromechanical input devices,
(b) a graphical display device,
(c) a data storage device,
(d) means responsive to instructions and specifications entered using the one or more electromechanical input devices for creating and altering surface data specifying a surface under design, reading and writing surface data to the storage device, and using the design data displaying a three-dimensional representation of the surface on the graphical display device so that a user can manually interact with the CAD system to create and alter the surface, whereby the surface data specifying the surface under design can be used to implement or fabricate a physical system, object or device, and wherein the design data specifies the surface as a non-uniform rational B-spline (NURBS) including a plurality of parameters, the improvement comprising:
(e) means for automatically reconfiguring the surface to avoid an obstacle using a simulated annealing process, the obstacle specified by data stored in said storage device and having a common frame of reference with the surface, and wherein the surface data provides the current surface data used in the simulated annealing process comprising:
  (1) means for calculating the cost of the current surface data based on primary and secondary cost functions according to the simulated annealing process;
  (2) means for randomly perturbing the surface data to generate perturbed surface data;
  (3) means for calculating the cost of the perturbed surface data based on a cost function according to the simulated annealing process;
  (4) means for comparing the cost of the perturbed surface data to that of the cost for the current surface data and setting the current state equal to the perturbed surface data if one or more first predetermined criteria are met;
  (5) means for accepting a current state as a final optimized reconfigured state when one or more predetermined criteria are met and storing the final optimized reconfigured state on the storage device so that it can be manually altered by a user with the CAD system; and
  (6) wherein said cost function comprises a function which penalizes non-orthogonality of tangent vectors to the surface at different points.

20. Apparatus according to claim 19 further wherein there is an additional cost function which penalizes non-uniformity between variations in the parameters and spacial variations in the surface, and the means for calculating the cost function includes means for adding the additional cost to a total cost.

21. Apparatus according to claim 19 further wherein there is an additional cost function which penalizes an expansion of the surface area of the surface, and further wherein the means for calculating the cost function includes means for adding the additional cost to a total cost.

* * * * *